Nov. 25, 1941.   G. R. MARSH   2,263,636
SIGNALING DEVICE
Filed Oct. 25, 1938
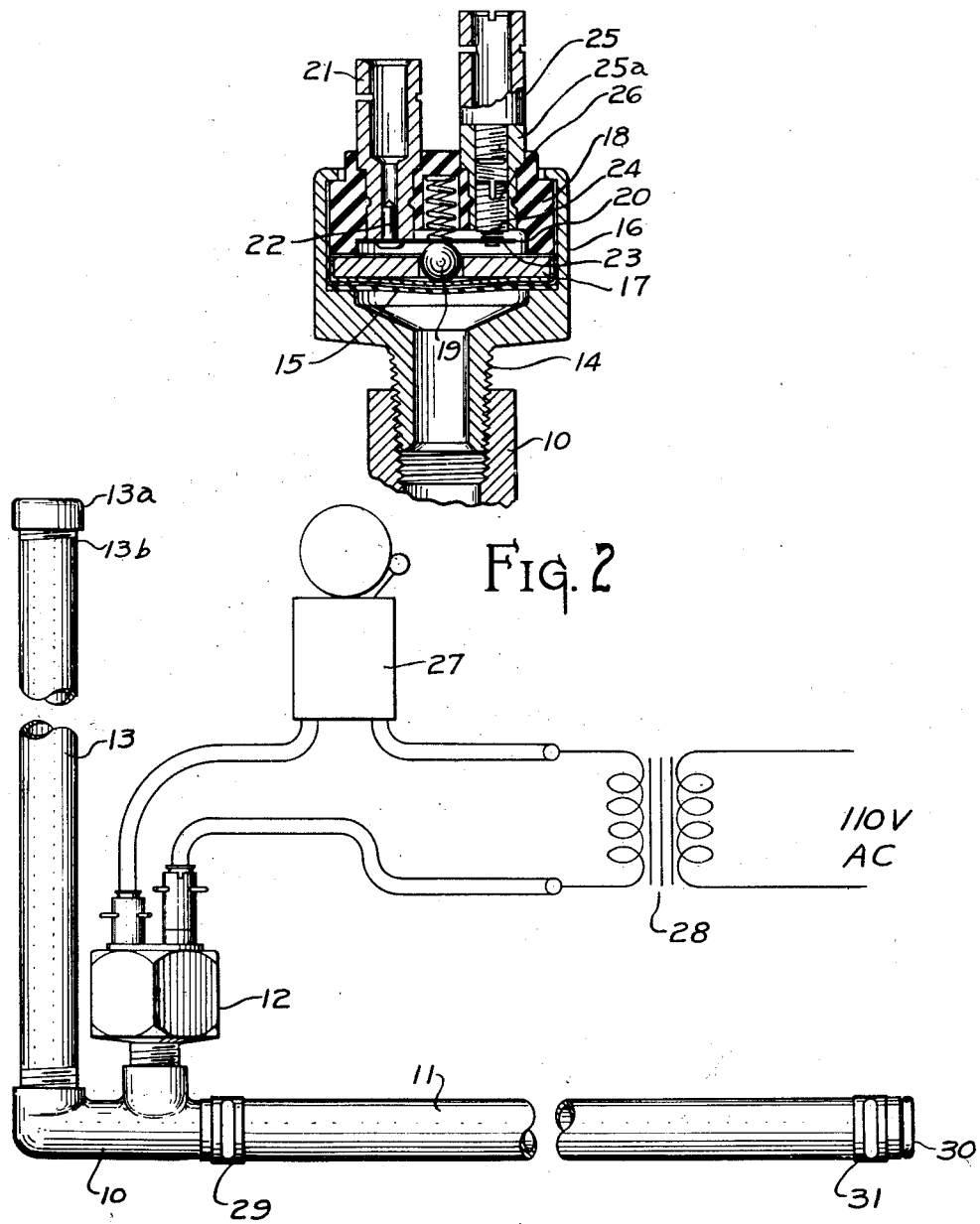
INVENTOR
Guy R. Marsh
BY
D. Henry Stoltenberg
ATTORNEY Patented Nov. 25, 1941

2,263,636

UNITED STATES PATENT OFFICE 2,263,636

SIGNALING DEVICE

Guy R. Marsh, Toledo, Ohio

Application October 25, 1938, Serial No. 236,899

1 Claim. (Cl. 200—86)

This invention relates to signaling devices, more particularly to signaling devices adapted to indicate the approach of vehicles, such as applied, for example, in gasoline filling stations.

Various devices of this kind have been proposed to fulfill this function but the structures proposed have been in general very complicated and costly to manufacture. They also had the great disadvantage that they were not rugged and often needed adjustment to operate properly. Another disadvantage to be found in prior art devices was that a special type of quashing hose was necessary for use with them, which was very flexible and relatively expensive. Furthermore, the hose was of relative limp construction, due to its flexibility, and operated at low internal pressure, so that after use for a short period of time, the complete quashing given to the hose by having a vehicle pass over it, would cause the hose to break down, so that frequent replacement was required. This made these devices expensive to maintain.

The present invention contemplates a system in which a relatively high pressure is used, so that the hose will not be collapsed by the vehicle passing over it, which will prevent the complete quashing which was so detrimental to the hoses used in the prior art. At the same time, the relatively high pressure will maintain the roundness of the hose, so that the material will not be compressed or flattened, what made a special hose necessary previously. This system then allows the use of ordinary garden hose with efficiency, which materially lowers the first cost of the device.

The use of the high pressure in the contemplated device has the further advantage that the expansion and contraction of the fluid and the hose is less sensitive, and does not give rise to any complicated adjustments, such as are found in the devices found in the prior art.

It is, therefore, an object of this invention to provide a signaling system using a pressure responsive device to give a signal when a vehicle passes over a hose to create a pressure by which the pressure responsive device is actuated, in which a relatively high pressure is used to allow the hose to maintain a substantially round condition when being compressed by the wheels of a vehicle.

It is a further object of this invention to provide a signaling device having a pressure-responsive device actuated by a pressure-initiating device comprising a hose filled with fluid and cooperating with the wheels of a vehicle to initiate a pressure to actuate the pressure-responsive device wherein compensation for changes of temperature is attained by the use of an air chamber which will prevent generation of the high pressure necessary to actuate the pressure-responsive device, such as is utilized under the normal operation of the device during a signaling period.

Other objects and advantages of this invention relating to the arrangement, operation and function of the related elements of the structure, to various details of construction, to combinations of parts and to economies of manufacture, will be apparent to those skilled in the art upon consideration of the following description and appended claim, reference being had to the accompanying drawing forming a part of this specification wherein like reference characters designate corresponding parts in the several views.

Figure 1 is an elevational view of the signaling device incorporating a diagram of connections for the electrical circuits.

Figure 2 is an elevational sectional view of the pressure-responsive device utilized in the signaling device.

Referring to the drawing, particularly to Figure 1, a metallic fitting 10 is provided which is adapted to cooperate with three elements, a hose 11, which may be placed in a drive-way to be contracted by having the wheels of a vehicle passing over it, a pressure-responsive device 12, and an air-chamber 13, which is made of a size suitable for the length of hose used.

The pressure-responsive device and the air-chamber are adapted to be placed in threaded relation with the fitting as is clearly shown in Figure 1. The air-chamber 13 may be formed from a short piece of tubing which is provided at its upper end with an air-tight cup 13a which is preferably fitted thereto by means of a threaded relation 13b.

The pressure responsive device 12 is preferably of the type generally used in connection with the brake systems of automobiles, which may be modified by the use of a diaphragm of greater flexibility than normally used in the automotive braking art. The device illustrated in detail in Figure 2 has a threaded portion 14 whereby it is adapted to be threaded into the fitting 10, and a cup-shaped container 15 with a hexagonal exterior 16 into which is fitted a diaphragm 17 and a switch block 18 of insulating material such as Bakelite or the like. A ball-bearing 19 is provided to cooperate with the upper surface of the diaphragm to transmit movement to a switch arm 20, whose one end is attached to a binding post 21 by means of a rivet 22 and whose other end is fitted with a contact 23 adapted to cooperate with a second contact 24 fitted to another binding post 25. The binding posts 23 and 24 are preferably moulded into the switch block 18 and are held thereby in insulating relation from each other and from the body of the pressure-responsive device. The second contact 24 is preferably made adjustable in its relation with the first contact by being mounted upon the end of a kerfed screw 26, which is in threaded relation with an internally threaded bore 25a of the binding post 25. In this manner, the position of the contact 24 may be changed to increase or diminish the movement of the first contact 23 under the influence of the arm 20, which in turn allows the effectiveness of the deflection of the diaphragm 17 to be varied to adjust the pressure-responsive device at the desired operating pressure suitable for the conditions under which it is to be used.

The binding posts 21 and 25 are connected in electrical circuit with a signaling device such as an electric bell 27 and a source of electrical energy such as a bell-ringing transformer 28 which is connected to the usual 110-volt A. C. supply circuits. When the contacts 23 and 24 are closed, the electrical circuit through the bell is completed and it will ring to give notice to an attendant.

The hose 11, which is attached to the fitting 10 and clamped thereto by strap element 29, is in communication with the chamber 15 in the pressure-responsive device and has its far end closed by means of a plug 30, which is held therein to form a leak-proof joint by means of strap clamp 31. The hose 11, the fitting 10, the chamber 15 are filled with a suitable fluid such as an anti-freeze, alcohol or the like, by removing the cap 13a from the pipe 13, until substantially all the space therein is filled, excepting a relatively small space adjacent the upper end of the expansion chamber.

Upon change in temperature in the system, compensating expansions and/or contractions take place between the hose and the fluid, that is, as the temperature increases, the expansion of the fluid is compensated by the expansion of the hose, so that no appreciable pressure will result which would tend to actuate the diaphragm to a point sufficient to close the signaling circuit. A relatively small air space is left in the expansion chamber to prevent the ready accumulation of pressures necessary to operate the pressure-responsive device under changes of temperature. The air space, however, is small enough, so that when an automobile wheel passes over the hose, there is a displacement of fluid which will give the necessary high pressure to actuate the pressure-responsive device to close the signaling circuit. Inasmuch as the air space in the expansion chamber is relatively small, the displacement of fluid in the hose at the point where the automobile wheel is passing over it is also relatively small, and the hose does not lose its round contour to be completely quashed. The fluids contrained by the space will quickly build up the necessary pressure internally of the hose to support it and prevent this detrimental flattening of the hose which would quickly destroy it.

It is to be understood that the above detailed description of the present invention is intended to disclose an embodiment thereof to those skilled in the art, but that the invention is not to be construed as limited in its application to the details of construction and arrangement of parts illustrated in the accompanying drawing, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

In a signaling device, a relatively long flexible hose closed at the ends to form a closed pressure system and extending across a vehicular passageway to cooperate with the wheels of vehicles to create changes of fluid pressure in the system, a non-freezing liquid completely filling the hose, a fluid pressure responsive means cooperating with the hose comprising a fluid-tight flexible diaphragm and a casing to form a relatively small pressure chamber on only one side of the diaphragm, said chamber being in communication with the hose and filled with liquid, normally-open switch means adapted to be actuated by the diaphragm to close a signaling circuit during flexure of the diaphragm by a relatively high fluid pressure created by small fluid displacement, and an expansion chamber of relatively small capacity to allow compensation due to changes of ambient temperature.

GUY R. MARSH.